United States Patent [19]

Stambaugh et al.

[11] 3,990,494
[45] Nov. 9, 1976

[54] TIRE REMOVAL MEANS WITH SAFETY LOCK

[75] Inventors: Gary E. Stambaugh, Aurora; Kenneth W. Timmons, Plano, both of Ill.

[73] Assignee: Caterpillar Tractor Co., Peoria, Ill.

[22] Filed: Sept. 2, 1975

[21] Appl. No.: 609,643

[52] U.S. Cl. ............................. 152/404; 152/405; 152/427
[51] Int. Cl.² .................. B60C 23/04; B60C 29/00
[58] Field of Search .......... 152/427, 396, 403, 404, 152/405, 410, 398

[56] References Cited
UNITED STATES PATENTS

| | | | |
|---|---|---|---|
| 3,006,692 | 10/1961 | Schubert | 152/405 |
| 3,831,658 | 8/1974 | Poplawski | 152/427 |
| 3,882,919 | 5/1975 | Sons, Jr. et al. | 152/410 |

*Primary Examiner*—Drayton E. Hoffman
*Attorney, Agent, or Firm*—Phillips, Moore, Weissenberger, Lempio & Strabala

[57] ABSTRACT

A vehicle wheel, on which a tire is mounted, comprised of two rim portions fixed together by fastening bolts is provided with a means to prevent disassembly of the rim portions while the tire mounted thereon remains inflated. In the preferred embodiment, a cover plate affixed to one of the rim members by a hinge is positionable over the heads of the fastening bolts and retained thereon by an elongated pin having an enlarged head, the pin extending through an aperture in the rim. The locking pin is urged to this locking position while the tire is inflated by pressure in the tire.

14 Claims, 5 Drawing Figures

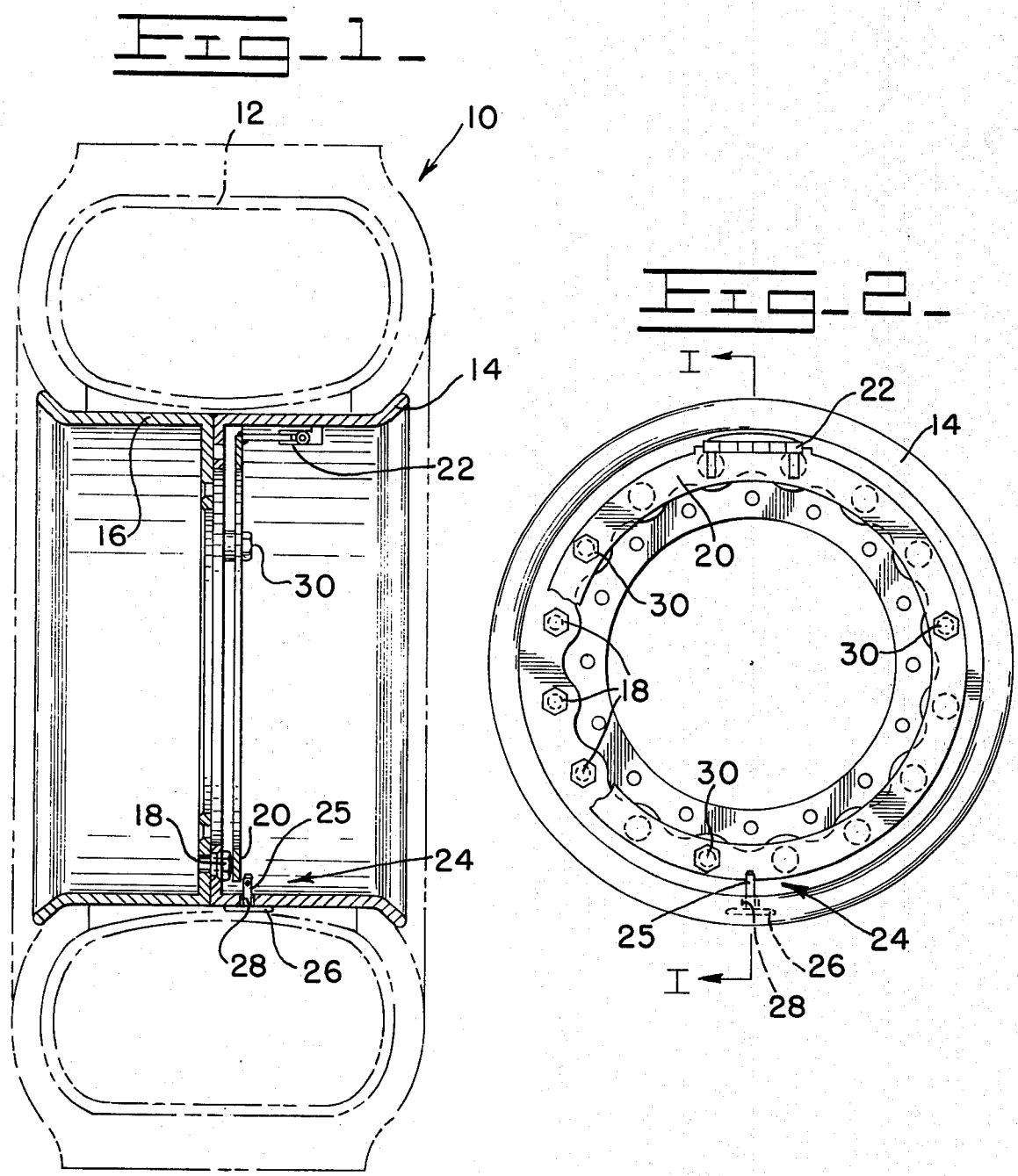

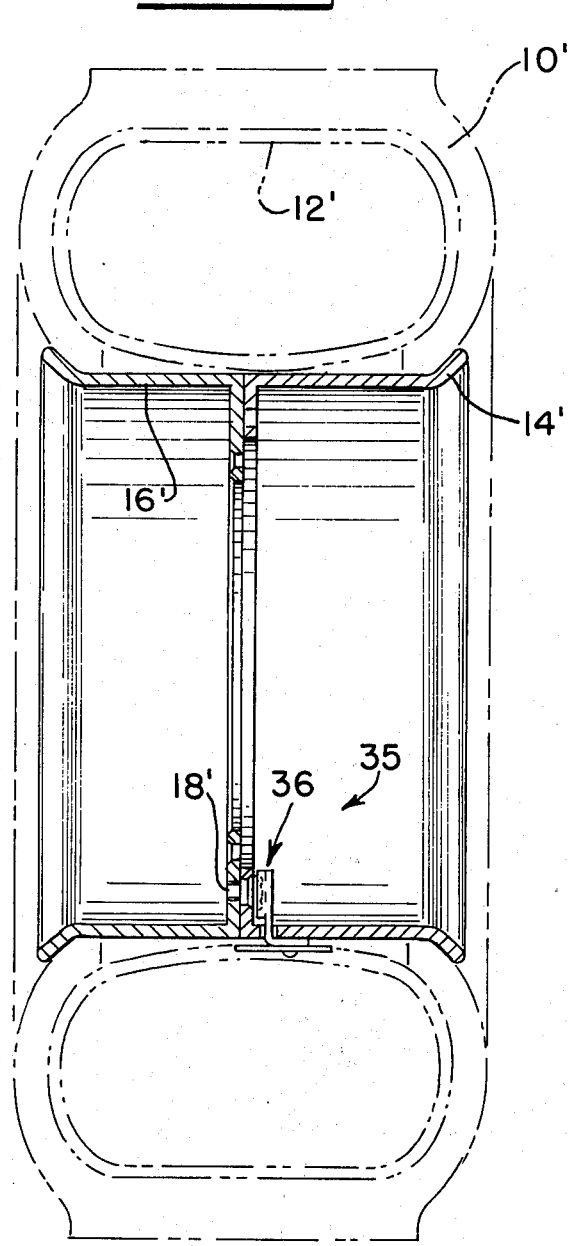
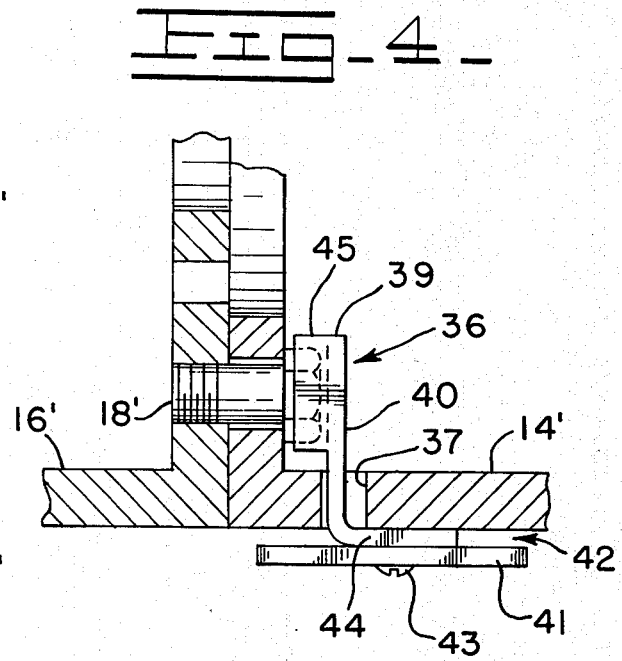
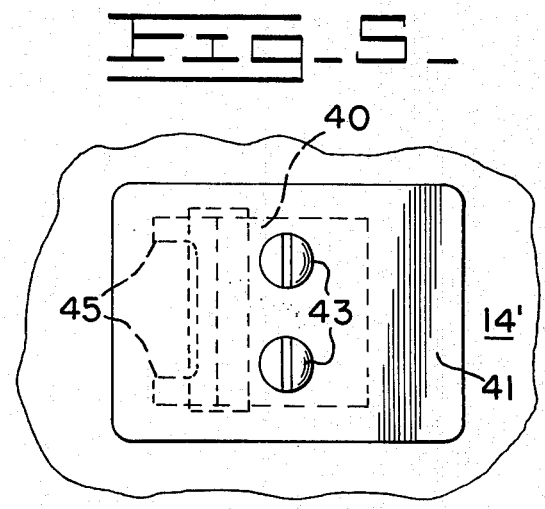

TIRE REMOVAL MEANS WITH SAFETY LOCK

BACKGROUND OF THE INVENTION

Vehicle wheels, particularly wheels for large construction vehicles, may be of a split rim type construction. Such a split rim facilitates mounting and dismounting of tires in that the rim members are positioned in relation to the tire, rather than stretching the tire over the rim member with the possibility of damaging the tire. Split rim assemblies present a particular hazard while dismounting a tire from the vehicle wheel when the tire has not been fully deflated. In a partially inflated condition, release of fastening bolts presents a possibility of serious injury to the individual effecting the tire removal by a sudden parting of the rim members and the possibility of attaching bolts or a rim member being catapulted with considerable force toward the individual so removing the tire. In order to avoid this hazard, various rim assemblies have been developed to prevent disassembly of the wheel prior to deflation of the tire. Typical of these safety means is a locking member associated with the means for inflating or deflating the tire. Such a system is described in U.S. Pat. No. 3,831,658 wherein a locking plate must be aligned with a locking pin member. Although the locking plate described therein serves properly to prevent removal of the tire prior to deflation, the plate must itself be physically removed from the rim and set to one side before further disassembly may proceed.

SUMMARY OF THE INVENTION

Accordingly, it is the object of this invention to provide a tire removal means for a split rim type wheel wherein the rim assembly may be disassembled only after the tire mounted thereon has been substantially deflated.

It is a further object of this invention to provide a tire removal means which, while fulfilling the above object, allows assembly and disassembly of the rim members and associated locking means without requiring alignment of locking pins and locking holes.

It is a still further object of this invention to provide a tire removal means which, while fulfilling the above objects, is of simple and economical construction.

Broadly stated, the invention is a combination of an inflatable tire means mounted on a rim assembly, the rim assembly comprising two rim members rigidly affixed together by fastening means allowing the tire means to be mounted thereon, the improvement comprising a lock assembly associated with one of the rim members and having at least one first portion and at least one second portion, said first portion positionable in a first position to block access to at least a portion of the fastening means and positionable in a second position to allow access to the fastening means. The second portion is associated with the first portion and with the tire means so that pressure in the tire means acts on the second portion to retain the first portion in the first position. The second portion is movable upon application of force thereto sufficient to overcome the force acting thereon by said pressure in the tire means to allow the first portion to be positioned in the second position.

BRIEF DESCRIPTION OF THE DRAWINGS

These and other objects of the invention will become apparent from a study of the following specification and drawings in which:

FIG. 1 is a cross-sectional view of the tire removal means which is the subject of this invention.

FIG. 2 is a side elevation view of the rim assembly incorporating the provisions of this invention.

FIG. 3 is a cross-sectional view of an alternate embodiment of the tire removal means.

FIG. 4 is a detail of the locking means shown in FIG. 3.

FIG. 5 is a bottom view of the locking means of FIG. 4.

DESCRIPTION OF THE PREFERRED EMBODIMENT

Referring to FIG. 1, a tire means, in the preferred embodiment comprised of a tire 10 having an inflatable inner tube 12, is mounted on rim members 14 and 16. Rim members 14 and 16 are rigidly fixed together by a plurality of fastening bolts 18. Rim member 14 has associated therewith and pivotally affixed thereto by hinge means 22 a first portion comprised of annular cover plate 20, hinge means 22 allowing annular cover plate 20 to be positioned in a first position to block access to fastening bolts 18 and prevent removal thereof. Hinge means 22 further allows annular cover plate 20 to be positioned in a second position by pivoting annular cover plate 20 up and away (as viewed in FIG. 1) from fastening bolts 18, thereby allowing access thereto. Use of hinge means 22 avoids the necessity of aligning locking pins and locking holes required by previous tire removal means. A locking pin 24 having an elongated shaft 25 and an enlarged head 26 may be disposed through an aperture 28 in rim member 14. Aperture 28 is located in rim member 14 adjacent to and exterior of cover plate 20 when annular cover plate 20 is in a first position so that a second portion comprised of locking pin 24, when disposed therethrough, prevents annular cover plate 20 from pivoting away from fastening bolts 18. Annular cover plate 20 may be further retained in the first position by a plurality of bolts 30 threadably engageable in rim member 14. Locking pin 24 is associated with the tire means and urged into the locked position described above by pressure contained therein. In the tubed tire, as illustrated, the inflated inner tube 12 urges enlarged head 26 against rim member 14.

It is apparent that removal of bolts 30 with tire 10 in an inflated state and locking pin 24 in the locking position is insufficient to allow annular cover plate 20 to hingedly swing away from fastening bolts 18 allowing access thereto. In order to obtain access to fastening bolts 18, tire 10 must be deflated sufficiently to allow locking pin 24 to assume an unlocked position, that is, locking pin 24 must be depressed sufficiently by applying sufficient force thereto to overcome the pressure in the tire means to allow annular cover plate 20 to be swung up and away. Thus, the relatively safe state of a deflated tire must be attained before fastening bolts 18 may be loosened.

Assembly of a tire and rim assembly is accomplished in the normal manner with the additional step of inserting locking pin 24 through aperture 28 on assembly. Fastening bolts 18 may then be disposed through appropriate holes in rim member 14 and threadably engaged with rim member 16 and tightened appropriately. Annular cover plate 20 is then pivoted down and over fastening bolts 18 to its first position followed by inflation of tire 10 resulting in locking pin 24 being urged upwardly through aperture 28 to retain cover plate 20 in its first position. Bolts 30 may be installed once cover plate 20 is in its first position.

It is to be understood that, while tire 10 is shown to be a tubed tire, the invention is equally applicable to a tubeless tire wherein locking pin 24 with appropriate seal means additionally serves to seal aperture 28, the gas pressure contained in the tire cavity serving to urge enlarged head 26 against rim member 14. Finally, locking pin 24 may also serve as a valve stem means for inflating tire means 10 in addition to acting in a locking pin capacity.

An alternate embodiment is depicted in FIGS 3, 4 and 5 which is particularly adaptable to tire means inflatable by an inner tube. Referring to FIG. 3, a tire 10' is mounted on a split rim wheel comprised of rim members 14' and 16'. The rim members 14' and 16' are affixed one to the other by a plurality of fastening bolts 18' circumferentially disposed about the rim assembly. Disposed within tire 10' is an inner tube 12'. A lock assembly 35 is comprised of at least two locking devices 36 each having a first portion 40 and a second portion 42 forming an angle shaped bracket 39 associated with one of the rim members, such as rim member 14'. Locking device 36 is disposed through an aperture 37 in rim member 14'. Angle shaped bracket 39 on first portion 40 defines a U-shaped end 45, the legs of the U-shaped end 45 formed generally at right angles thereto and spatially separated sufficiently to allow U-shaped end 45 to substantially cover the head of fastening bolt 18'. Second portion 42 of angle shaped bracket 39 is integrally formed with said first portion 40 and is comprised of leg 44 and plate 41 removably affixed thereto by suitable fastening means 43. Inflation of tube 12' urges each locking device 32 into the position shown in FIG. 4 to prevent access to the fastening bolt means 18'. As noted above, at least two locking devices 32 are necessary for the invention in this embodiment.

To assemble the alternate embodiment as depicted in FIG. 4, the locking device 36 without plate 41 affixed thereto is inserted through aperture 37 of rim member 14' with U-shaped end 45 extending radially inwardly as shown in FIG. 4, and plate 41 is affixed thereto by screws 43. It should be noted that U-shaped end 45 may be made sufficiently large to prevent locking device 36 from passing through aperture 37 when plate 41 is affixed thereto. Following the placement of locking device 36 in aperture 37, the tire and associated tube may be mounted in the conventional manner. Each locking device 36 may be pivotally moved away from rim member 14' allowing fastening bolts 18' to be threadably engaged therein and tightened accordingly. Inflation of tube 12' may then be undertaken, such inflation urging locking devices 36 into the position shown in FIG. 4 preventing access to at least two of the fastening bolts 18', thereby preventing disassembly of the rim assembly prior to deflation of the tires sufficiently to allow first portion 40 to be urged away from fastening bolt 18'. By forming locking device 36 with the expanded U-shape end 45 to prevent locking device 36 from passing through aperture 37 with plate 41 installed, the potential problem of loss of small parts is avoided.

Although the alternate embodiment, as described above, is particularly adaptable to tires with tubes, suitable sealing means may be provided in aperture 37 to allow the use of the alternate embodiment with tubeless tires.

What is claimed is:

1. In combination with inflatable tire means mounted on a rim assembly having first and second rim members, and fastening means for rigidly affixing said first and second rim members together allowing said tire means to be seated on the rim members, the improvement which comprises:

a lock assembly associated with one of the rim members and having at least one first portion and at least one second portion, said first portion positionable in a first position to block access to at least a portion of said fastening means and positionable in a second position for allowing access to said fastening means;

said second portion operatively connected with said first portion and said inflatable tire means so that pressure in said tire means acts on said second portion to retain said first portion in said first position, the second portion being movable upon application of force thereto sufficient to overcome the force acting thereon by said pressure on the tire means to allow said first portion to be positioned in said second position.

2. The combination set forth in claim 1 wherein said first portion comprises an annular cover plate associated with said first rim member and positionable in said first position to block access to the fastening means and positionable in said second position to allow access to said fastening means; and further wherein said second portion comprises locking pin means associated with said rim assembly and positionable in a locking position for retaining said annular cover plate in said first position, and positionable in an unlocking position for allowing said cover plate to be moved from said first to said second position;

the locking pin means being associated with the inflatable tire means so that pressure in the tire means urges the locking pin means into said locking position to retain the annular cover plate in said first position, the locking pin means being movable to the unlocking position upon application of force thereto sufficient to overcome the urging force applied thereto by said pressure on the tire means.

3. The combination as set forth in claim 2 further comprising hinge means pivotally associating said annular cover plate with said first rim member, for hingedly allowing movement of the annular cover plate to its first and second positions.

4. The combination as set forth in claim 3 wherein said tire means comprises a tire and an inflatable inner tube.

5. The combination as set forth in claim 4 wherein said first rim member defines an aperture substantially adjacent and exterior of said cover plate with said cover plate in the first position, said locking pin being disposed in said aperture with said locking pin means in the locking position.

6. The combination as set forth in claim 5 wherein said locking pin means comprises an elongated shaft having an enlarged head and further wherein said pressure for urging said pin means to a locking position comprises pressure contained in said inflatable inner tube with said inner tube pressurized to engage the enlarged head so that the elongated shaft is urged through said aperture.

7. The combination as set forth in claim 6 further comprising bolt means for affixing said annular cover plate to said first rim member with said annular cover plate in said first position.

8. The combination as set forth in claim 1 wherein said lock assembly comprises at least one additional first portion and one additional second portion, each first portion integrally formed with a second portion to form at least two generally right angle shaped bracket members each pivotally associated with one of the rim members; each said first portion of a U-shape and of sufficient size to block access to a portion of said fastening means and urged into said first position by pressure in the tire means acting on the second portion integrally formed therewith, the second portion being movable by application of force on said first portion acting upon said second portion sufficient to overcome the urging force applied to said second portion by said pressure in the tire means to allow said first portion to be positioned in said second position.

9. The combination as set forth in claim 8 wherein the first rim member defines at least two elongated apertures each sized to receive one of said first and second integrally formed portions generally at the juncture thereof, and further wherein the second portion comprises a leg, and a plate member removably fixed to the leg,
each first portion and plate member sized to prevent the locking assembly from passing through the elongated apertures while allowing the lock assembly to pivotally move away from said fastening means.

10. The combination as set forth in claim 9 further comprising fastening screws, said fastening screws for affixing each plate member to a leg whereby removal of said screws allows removal of each leg from an elongated aperture defined in the rim member.

11. A split rim type assembly for mounting of an inflatable tire thereupon comprising:
a first rim member;
a second rim member;
fastening means for rigidly affixing said first and second rim members together allowing a tire means to be mounted thereupon;
a lock assembly associated with one of the rim members and having at least one first portion and at least one second portion, said first portion positionable in a first position to block access to at least a portion of said fastening means and positionable in a second position for allowing access to said fastening means;
said second portion operatively connected with said first portion and a mounted inflatable tire means so that pressure in a mounted inflatable tire means acts upon said second portion to retain said first portion in said first position, the second portion being movable upon application of force thereto sufficient to overcome the force acting thereupon by the pressure in a mounted inflatable tire means to allow said first portion to be positioned in said second position.

12. The split rim type wheel assembly as set forth in claim 11 wherein the first portion comprises an annular cover plate associated with the first rim member and positionable in the first position to block access to the fastening means and positionable in the second position to allow access to the fastening means;
and further wherein the second portion comprises;
locking pin means associated with the first rim member and positionable in a locking position for retaining the annular cover plate in the first position, and positionable in unlocking position for allowing the cover plate to be moved from first to the second position;
the locking pin means being associated with a mounted inflatable tire means so that pressure in a mounted tire means urges the locking pin means into the locking position to retain the annular cover plate in the first position, the locking pin means being movable to the unlocking position upon application of force thereto sufficient to overcome the urging force applied thereto by pressure in a mounted tire means.

13. The split rim type wheel assembly as set forth in claim 12 further comprising hinge means pivotally associating the annular cover plate with the first rim member, for hingedly allowing movement of the annular cover plate to its first and second positions.

14. The split rim type wheel assembly as set forth in claim 13 wherein the first rim member defines an aperture substantially adjacent and exterior of the annular cover plate with said annular cover plate in the first position, the locking pin means being disposed in said aperture with said locking pin means in the locking position.

* * * * *